(12) United States Patent
McCandless et al.

(10) Patent No.: US 9,426,239 B2
(45) Date of Patent: Aug. 23, 2016

(54) METHOD AND SYSTEM FOR PERFORMING ANALYSIS OF SOCIAL MEDIA MESSAGES

(71) Applicant: Oracle International Corporation, Redwood Shores, CA (US)

(72) Inventors: Timothy P. McCandless, Boulder, CO (US); Mehrshad Setayesh, Lafayette, CO (US); Duo Chen, South San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 260 days.

(21) Appl. No.: 13/795,895

(22) Filed: Mar. 12, 2013

(65) Prior Publication Data
US 2014/0280525 A1    Sep. 18, 2014

(51) Int. Cl.
  H04L 29/08    (2006.01)
  G06F 17/30    (2006.01)
  G06Q 50/00    (2012.01)

(52) U.S. Cl.
  CPC ......... *H04L 67/22* (2013.01); *G06F 17/30699* (2013.01); *G06F 17/30867* (2013.01); *G06Q 50/01* (2013.01); *H04L 67/18* (2013.01); *H04L 67/2819* (2013.01); *H04L 67/306* (2013.01)

(58) Field of Classification Search
  CPC . H04L 67/22; H04L 12/588; H04L 12/2486; H04L 41/5064; H04L 51/32; H04L 67/306; H04L 67/2819; H04L 67/18; H04M 2203/655; G06Q 50/01; G06Q 10/06; G06F 17/30699; G06F 17/30867
  See application file for complete search history.

(56) References Cited

U.S. PATENT DOCUMENTS

| | | | |
|---|---|---|---|
| 7,289,949 B2* | 10/2007 | Warner et al. | 704/9 |
| 8,769,576 B2 | 7/2014 | Burkit et al. | |
| 8,775,429 B2 | 7/2014 | Choudary et al. | |
| 8,930,384 B2 | 1/2015 | Sommer | |
| 2010/0211868 A1* | 8/2010 | Karmarkar et al. | 715/234 |
| 2011/0066613 A1 | 3/2011 | Berkman et al. | |
| 2011/0213785 A1 | 9/2011 | Kristiansson et al. | |
| 2011/0246378 A1* | 10/2011 | Prussack et al. | 705/310 |
| 2012/0030210 A1* | 2/2012 | Sankhla et al. | 707/741 |
| 2012/0047219 A1* | 2/2012 | Feng et al. | 709/207 |
| 2012/0191644 A1 | 7/2012 | Carter et al. | |
| 2012/0215844 A1 | 8/2012 | Ferlez et al. | |
| 2012/0278387 A1* | 11/2012 | Garcia | G06Q 50/01 709/204 |
| 2012/0290399 A1 | 11/2012 | England et al. | |
| 2012/0324004 A1 | 12/2012 | Le et al. | |

(Continued)

OTHER PUBLICATIONS

Non-final Office Action dated Jan. 6, 2015 for related U.S. Appl. No. 13/795,699.

(Continued)

*Primary Examiner* — Chris Parry
*Assistant Examiner* — Daeoo Lee
(74) *Attorney, Agent, or Firm* — Vista IP Law Group, LLP; Peter Mei

(57) ABSTRACT

Disclosed is an improved method, system, and computer program product for analyzing social media content. Correlation analysis is used to analyze the social media data snippets. The correlation analysis is performed by reviewing other items of data that are outside of the message content itself. The present approach can advantageously be used to analyze and understand the content of social media message even where only very small quantities of data are provided within each message posting.

20 Claims, 5 Drawing Sheets

(56) References Cited

U.S. PATENT DOCUMENTS

| | | |
|---|---|---|
| 2013/0018896 A1 | 1/2013 | Fleischman et al. |
| 2013/0046579 A1 | 2/2013 | Feiks |
| 2013/0054667 A1 | 2/2013 | Mahajan |
| 2013/0097176 A1 | 4/2013 | Khader et al. |
| 2013/0179440 A1 † | 7/2013 | Gordon |
| 2013/0246430 A1 | 9/2013 | Szucs et al. |
| 2013/0275429 A1 | 10/2013 | York et al. |
| 2014/0052718 A1 | 2/2014 | Waupotitsch et al. |
| 2014/0136323 A1* | 5/2014 | Zhang et al. ............... 705/14.53 |
| 2014/0278769 A1 | 9/2014 | Mcandless et al. |
| 2014/0280168 A1 | 9/2014 | Setayesh et al. |

OTHER PUBLICATIONS

Final Office Action dated Aug. 14, 2015 for related U.S. Appl. No. 13/795,699.

Non-final Office Action dated Apr. 8, 2015 for related U.S. Appl. No. 13/795,802.

Final Office Action dated Oct. 22, 2015 for related U.S. Appl. No. 13/795,802.

Non-final Office Action dated Dec. 21, 2015 for related U.S. Appl. No. 13/795,699.

Non-Final Office Action dated Jul. 1, 2016 for related U.S. Appl. No. 13/795,802.

\* cited by examiner

† cited by third party

METHOD AND SYSTEM FOR PERFORMING ANALYSIS OF SOCIAL MEDIA MESSAGES

BACKGROUND

Given the widespread availability and usage of the internet by consumers, many businesses have become interested in being able to effectively monitor the content and commentary provided by such consumers. Interactive websites such as social networks and blogs provide a wealth of useful information that can be advantageously used by a business. It would be very desirable to allow the businesses to stay informed of actionable social networking content, for example, to identify potential customers and possible sales leads or to identify problematic situations that may require immediate involvement of customer service personnel.

With many forms of social media, the content of the social media message is itself often sufficient to allow recognition of topic of that content. This is because the social media content will often include a large enough quantity of data to make it readily apparent what that content is directed towards. For example, a blog posting will often include a large and detailed quantity of text and/or pictures that make the topic of that blog posting very self-evident.

However, there are many types of social media content where it is very commonplace to have very small quantities of content for each posting. For example, there are many types of systems that allow for sharing electronic messages among a community of users, where the content of each message may only have a few words, phrases, or sentences. Twitter is a notable example of this type of message sharing system where each message may only contain a very small snippet of text. Other examples of message systems that may include very small message snippets include Internet forums, electronic mailing lists, blogs and microblogs, and social networks. In any of these systems, users may post very brief messages that can be read by other users of the system.

With these types of messages, it is very difficult by just looking at the message itself to determine the topic of the message. This creates a problem for any electronic system that seeks to perform automated analysis of the social media content.

Various techniques have been implemented in an attempt to address this problem. For example, hash tags are often used to provide the context for a particular message or tweet. An electronic analysis system can use the hash tags to interpret the content or topic of the message, even if there is not a sufficient quantity of data in the message itself to permit this type of analysis.

However, this approach suffers from many drawbacks. First, this technique is useless if the user creating the message fails to use hash tags. Even when used, problems occur if the message creators use inconsistent hash tags, or if a mistake is made in the hash tag, e.g., when a typographical or spelling error occurs in the hash tag.

Therefore, there is a need for an improved approach that can be used to analyze any social media content, even social media content that contain very small quantities of data.

SUMMARY

Embodiments of the invention provide an improved method, system, and computer program product for analyzing social media content. Correlation analysis is used to analyze the social media data snippets. The correlation analysis is performed by reviewing other items of data that are outside of the message content itself. The present approach can advantageously be used to analyze and understand the content of social media message even where only very small quantities of data are provided within each message posting.

Other additional objects, features, and advantages of the invention are described in the detailed description, figures, and claims.

DETAILED DESCRIPTION

The present disclosure is directed to an approach for analyzing social media content. The present approach can be used to analyze and understand the content of social media message even where only very small quantities of data are provided within each message posting.

To accomplish this, correlation analysis is performed upon the social media data. The correlation analysis is performed by reviewing other items of data that are outside of the message content itself.

Such other items of data may include, for example, external data about the message sender. As just one example, a message may include only the words "New galaxy sighted!" Semantic analysis may be performed upon other writings or messages made by the author in the past to identify the semantic context of the current message. The analysis of the earlier writings by the author may indicate, for example, that current message snippet is in the context of an astronomy message or alternatively in the context of a new mobile telephone.

Correlation analysis may also be made by reviewing the content of other contemporaneous messages or data. For example, consider a message that only includes the words "I just heard a loud boom!" This message does not by itself contain enough data to indicate specifically what it is directed towards. In fact, even the author of the message may not know what caused the loud noise and therefore is not capable of providing the exact context for the message within the body of the message content. However, analysis of other messages, news articles or data, combined with a review of the date, time, and location of the message author can provide enough information to determine the context for the message. For example, identification of a news article or another message about a "gas pipe explosion" in the same geographic location as the message author can be used to determine that the context of the message "I just heard a loud boom!" is referring to a message about a gas pipe explosion.

This type of analysis may be used to correlate multiple message snippets to deduce the context of the messages. For example, a first message may contain the text "I heard a loud boom!" A second message may contain the text "I smell gas!" A third message may contain the text "My stove stopped working." By checking that all three messages are from the same general geographic area and were posted at the same general timeframe, one can deduce that a gas pipe explosion has occurred and that all three messages are directed to that same event.

Figure 1:
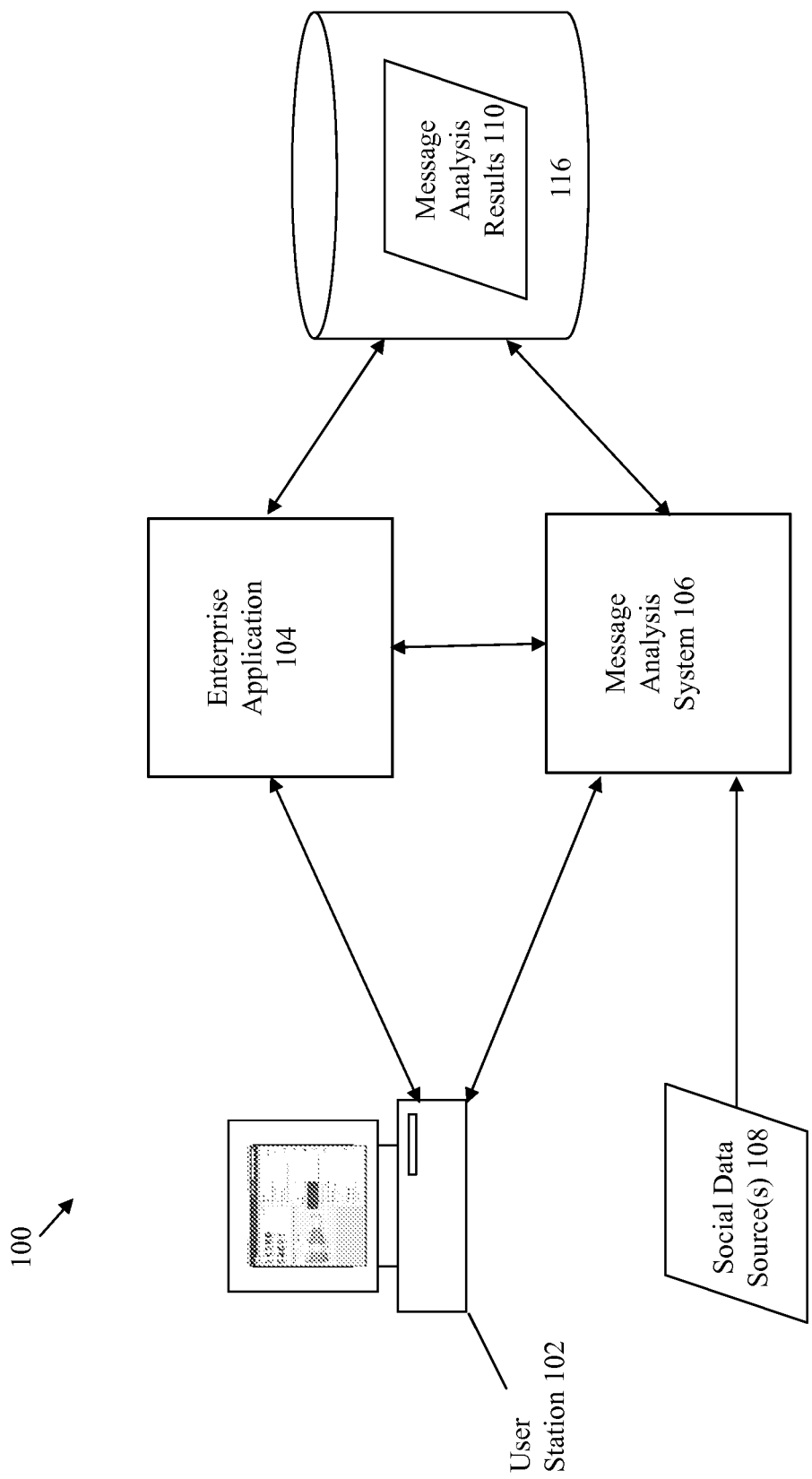
FIG. 1 illustrates a system to implement social media analysis according to embodiments of the invention.

FIG. 1 illustrates an example system 100 which may be employed in some embodiments of the invention to implement analysis of social media message snippets. The system 100 includes one or more users at one or more user stations 102 that operate the system 100. The user station 102 comprises any type of computing station that may be used to operate or interface with the applications in the system. Examples of such user stations include, for example, workstations, personal computers, or remote computing terminals. The user station 102 comprises a display device, such as a display monitor, for displaying a user interface to users at the user station. The user station also comprises one or more input devices for the user to provide operational control over the activities of the system, such as a mouse or keyboard to manipulate a pointing object in a graphical user interface to generate user inputs to the enterprise application 104 and/or message analysis system 106.

A message analysis system 106 is used to analyze the social media snippets, which are received from one or more online social data sources 108. Such social data sources include, for example, websites such as a social network or blog or web feed (e.g., Facebook, Twitter, Blogger, and RSS). The content may include one or more comments (e.g., Facebook comment, comment to a blog post, reply to a previous comment) or uploaded postings (e.g., images and associated metadata, text, rich media, URLs) at one or more sources. The social data/content may therefore comprise a variety of forms and/or types.

Correlation analysis is performed upon the social data. The correlation analysis is performed by reviewing other items of data that are outside of the message content itself. For example, the other items of external data may include social profile information about the message author. The correlation analysis may also be performed by reviewing the content of other contemporaneous messages or data. This permits a context to be deduced for the message even where the author of the message does not and/or cannot provide exact context for the message within the message body.

According to some embodiments, integration is provided between the message analysis system 106 and an enterprise application 104. The enterprise application 104 comprises any business-related application that provides visibility and control over various aspects of a business. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Exemplary enterprise application suites include, without limitation, Oracle Fusion Applications, Oracle eBusiness Suite and JD Edwards Enterprise One, Oracle PeopleSoft applications, all of which are available from Oracle Corporation of Redwood Shores, Calif.

For the purposes of explanation, one or more embodiments of the invention are illustratively described with reference to CRM applications. It is noted, however, that the invention may be applied to other types of enterprise applications as well, and is not to be limited to CRM applications unless explicitly claimed as such.

The analysis results 110 are stored into a database in a computer readable storage device 116. The computer readable storage device comprises any combination of hardware and software that allows for ready access to the data that is located at the computer readable storage device. For example, the computer readable storage device could be implemented as computer memory operatively managed by an operating system. The computer readable storage device could also be implemented as an electronic database system having storage on persistent and/or non-persistent storage.

Figure 2:
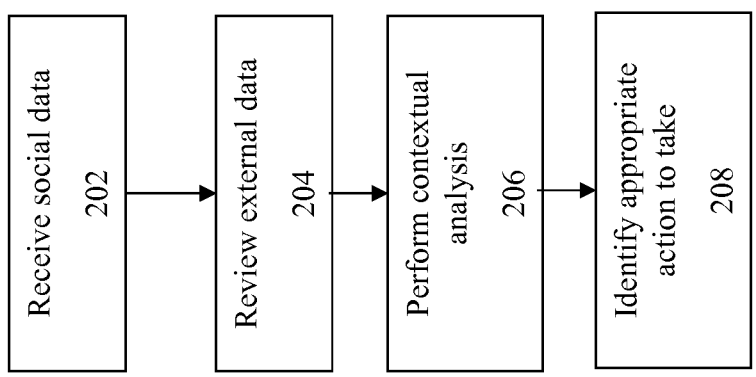
FIG. 2 illustrates a flowchart of an approach to perform social media analysis according to embodiments of the invention.

FIG. 2 shows a flowchart of an approach for implementing analysis of social media snippets according to some embodiments of the invention. At 202, data from social network systems are received into the system. The social data may be either public social network messages or private social network messages. Public social network messages include, for example, publically available content from public blog sites, twitter messages, RSS data, and social media sites such as Facebook. Private social network messages include, for example, content from internal company social networking sites. In some embodiments, the data that is received for processing includes non-social data. Such data includes, for example, enterprise data (e.g., email, chats, transcribed phone conversations, transcribed videos).

Next, at 204, analysis is performed on external data that relate to the message. This is not a direct analysis of the message content (e.g., message text or message hashtag). Instead, this is an analysis of the other data associated with the message, such as message metadata or author information. The idea is that since the message content by itself is too small and limited to allow accurate assessment of its content, contextual analysis can be performed to fill in the gaps.

At 206, contextual analysis is performed using the external data to identify the context and/or topic of the social message snippet. Correlation is performed in this step to identify the context of the message snippet. It is the combination of the analysis of the message content together with the analysis of the external data related to the message that permits accurate analysis of the message snippet, even where the message snippet is lacking in message length and/or depth.

Appropriate actions are taken at 208 to respond to the analysis results. The analysis results should correspond to areas of analytical importance with respect to the organizations that will be consuming the results of the system. For example, a business may seek to use the system to analyze social network data to (1) identify sales leads and (2) identify customer relations issues and dissatisfied customers. If these are the business'goals, then at least some of the analysis results will, in some embodiments, correspond to identification of the content that pertain to these categories.

Different approaches can be taken to process the message snippets that become actionable analysis results. Automated processing can be performed using rules and workflow engine, where a set of rules is provided in a rulebase. The rules identify how the analysis results should be handled and directed within a business organization. Another possible approach is to employ manual processing such that a user reviews the actionable social messages and manually takes action to direct the message to the appropriate destination.

Thereafter, the appropriate action is taken with respect to the message. For example, tickets can be sent to a social customer service cloud product, the identity of possible employment candidates can be sent to an HR department, opportunities can be provided to a CRM system, and product data/comments can be provided to ecommerce products and groups.

As an example, consider the scenario where message snippets such as "Internet down", "web sites not coming up", "my phone cut off" can be analyzed and identified as a possible service issue for a local telephone/DSL provider. The analysis may also confirm the geographic scope of the problem, e.g., based upon geographic locations of the message snippets. In this situation, even without waiting for numerous customer service calls to be placed to the phone/DSL provider, the company can immediately identify and address the potential issues, thereby reducing customer downtime and perhaps correct the problem before many/most customers even become aware that there may be an issue.

Figure 3:
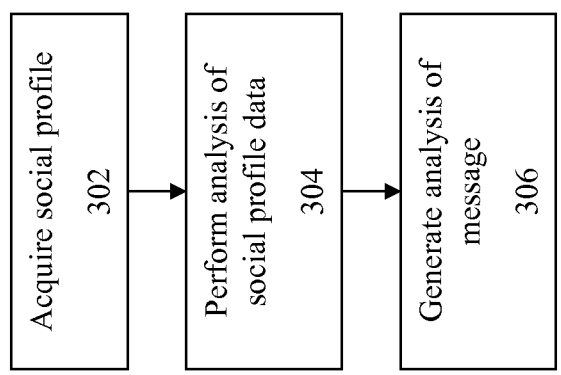
FIG. 3 illustrates a flowchart of an approach to use social profile data to perform social media analysis according to embodiments of the invention.

FIG. 3 shows a flowchart of one approach to implement analysis of message snippets using external data. At 302, social profile data is acquired for the author of the message snippet. The social profile data may include demographic information, including information about the person's income, age, profession, and geographic location. The social profile data may also include psychographic information about the message author. In addition, the social profile may include copies of other messages and postings by the author. The data can be obtained from any type of source, including social media and non-social media sources.

At 304, the social profile data is analyzed to identify information about the message author, including interests, concerns, affinity, and/or other items of interests about the author. In some embodiments, this analysis is performed in real-time for each author of interest. In alternate embodiments, this type of analysis is generally performed ahead of time and/or on an ongoing basis for authors of social media content. By performing this type of analysis ahead of time, the message snippets can be analyzed more expeditiously and with more immediacy.

At 306, correlation analysis is performed to identify the context and/or topic of the social message snippet. The content of the social message snippet is semantically analyzed in light of the social profile data to perform this type of analysis.

For example, latent semantic analysis (LSA), an advanced form of statistical language modeling, can be used to perform semantic analysis upon both the social profile data and the message snippet. This permits the system to understand the contextual and semantic significance of terms that appear within the data. For example, by gathering data about the author from his social profile, semantic analysis can be used to understand the difference between the term "Galaxy" used by the author for an astronomy context, "Galaxy" used to refer to the mobile phone brand, and "Galaxy" the name of a professional soccer team.

Figure 4:
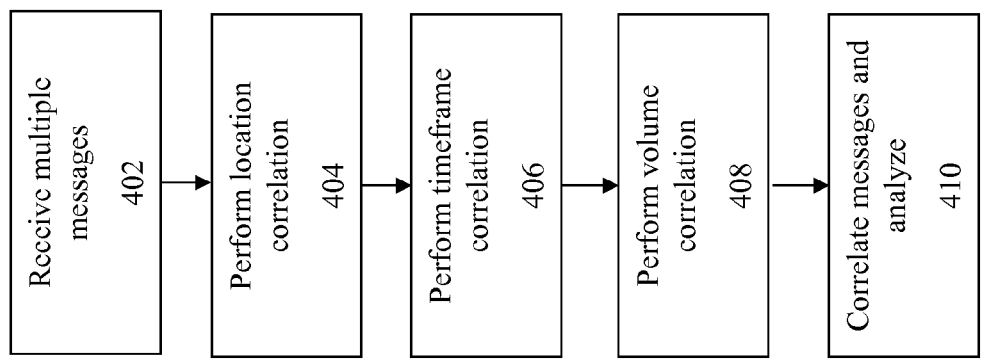
FIG. 4 illustrates a flowchart of an approach to use external messages to perform social media analysis according to embodiments of the invention.

FIG. 4 shows a flowchart of one approach to implement analysis of message snippets using additional messages. At 402, additional external messages are received for analysis in conjunction with the message snippet. These additional external messages comprise any external information including, for example, other message snippets, news articles, blogs, and forum postings.

At 404, location correlation is performed upon the messages. Location correlation is performed to identify other messages that pertain to or originate from the same general geographic region as the message snippet is being analyzed. The location information may be obtained from the message content themselves. The location may also be obtained from the message origination location, e.g., Tweet location. The author location may also be used to infer a location or the message, e.g., from the author's demographic or social profile data. Filtering can be applied to remove any messages that are geographically distant from the message snippet.

At 406, timeframe correlation may be performed upon the multiple messages. Timeframe correlation is performed to identify other messages that are relatively close in time to the subject of the message snippet.

Volume correlation is performed at 408. This step performs an analysis of message volume to determine, for example, whether there is a spike in social media messaging at around the same time as the social message snippet being analyzed.

Using the results of the above correlations, analysis is performed at 410 to identify the other messages that likely pertain to or correspond in some way with the message snippet. For example, messages that originate at the same point in time, from the same geographic regions, and/or at the same moment as a spike in messaging is likely to be relevant to the message snippet.

Semantic analysis and classifications are also performed upon the messages, to classify and filter the messages. The classification analysis permits the system to create and apply filters to identify themes, and to cluster together like-minded messages, topics, conversations, and content. This allows the system to deduce the context of the message snippet from the other related messages.

Semantic filtering may also be applied to the analysis. Semantic filtering is a mechanism that is provided to minimize miss-categorizations of the social data. Semantic filtering is used to remove the irrelevant material from the social data to reduce the occurrence of false positives, false negatives, and inappropriate responses/rejections within the actionable data. This permits the resulting data to be more relevant and accurate when provided to the enterprise applications. In some embodiments, all social data content is subject to semantic filtering to reduce the excess "noise" of irrelevant data.

Therefore, what has been described is an improved approach for implementing a system, method, and computer program product to analyze social media messages. Correlation analysis is used to analyze the social media data snippets. The correlation analysis is performed by reviewing other items of data that are outside of the message content itself. The present approach can advantageously be used to analyze and understand the content of social media message even where only very small quantities of data are provided within each message posting.

System Architecture Overview

Figure 5:
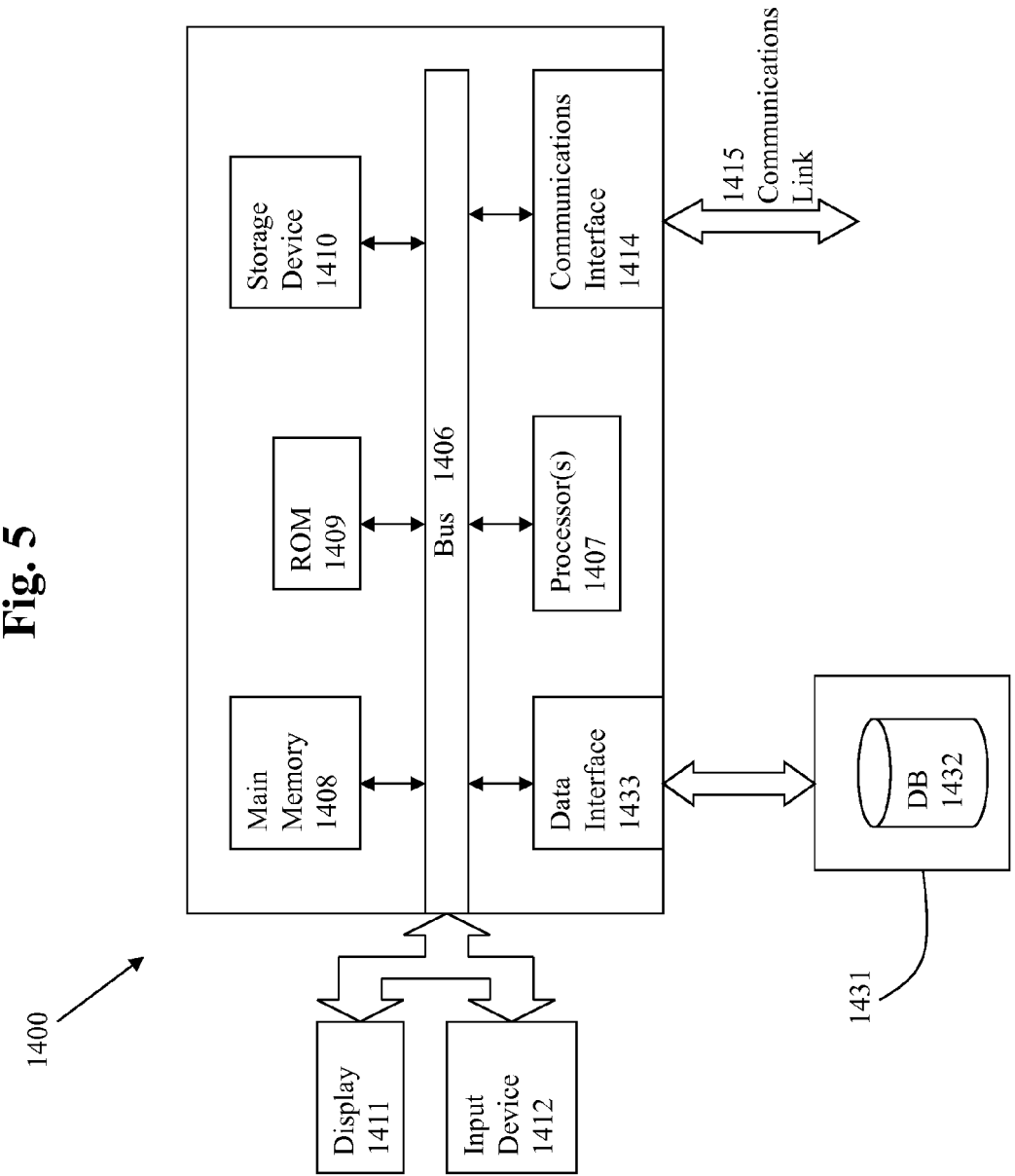
FIG. 5 depicts a computerized system on which an embodiment of the invention can be implemented.

FIG. 5 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), data interface 1433 is connected to database 1432 at location 1431, and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for correlating disparate social media data and identifying a context for correlated media data, the method comprising:
　analyzing social media messages using an analysis unit, the analysis unit being communicatively coupled to receive inputs from one or more online social data sources and to provide analysis outputs to a workflow engine, the analysis unit correlating the social media messages to identify a context based at least upon analysis of message contents, metadata, and social profile data, the analysis of the social media messages performed by a process comprising:
　　receiving social media content from the one or more online social data sources transmitted over one or more electronic communications links, the social media content comprising at least message contents, metadata, and social profile data,
　　determining a geographic location of the message contents,
　　removing the message contents that are beyond a geographical distance from the geographic location of at least one of the message contents,
　　performing latent semantic analysis on remaining message contents using the metadata and the social profile data to determine semantic significance of the remaining message contents,
　　clustering the messages into one or more clusters by classifying the messages based on at least the results of performing latent semantic analysis, and
　　correlating the at least one of the one or more clusters to identify a context for the remaining message contents using at least the metadata and the remaining message contents to generate correlation results,
　processing the correlation results using the workflow engine, the workflow engine processing the correlation results using a set of rules provided in a rulebase, the set of rules identifying how actionable items should be handled or directed within an organization, the correlation results processed by:
　　receiving the correlation results from the analysis unit transmitted over one or more electronic communications links,
　　identifying one or more actionable items based at least in part on the received correlation results,
　　automatically processing at least some of the one or more actionable items using the workflow engine and the set of rules.

2. The method of claim 1, wherein the social profile data comprises demographic or psychographic information about an author of the social media content.

3. The method of claim 1, wherein the social profile data is pre-analyzed to establish analysis data pertaining to an author prior to creation of the social media content.

4. The method of claim 1, wherein correlating comprises using at least one of location data, time data, volume data, and subject matter data.

5. The method of claim 1, in which semantic filtering is performed to reduce occurrence of false positives, false negatives or inappropriate responses.

6. The method of claim 1, wherein the analysis results are obtained that create actionable items for an enterprise software system and the enterprise software system comprises at least one of a customer relations management application, an enterprise resource planning applications, and a supply chain management application.

7. The method of claim 1, further comprising
　filtering to reduce occurrences of false positives, false negatives or inappropriate responses, the filtering comprising at least semantic filtering;
　storing the correlation results in an electronic database on one or more persistent computer readable storage devices;
　wherein correlating comprises using at least one of location data, time data, volume data, and subject matter data;
　wherein the workflow engine is part of an enterprise software system comprising at least one of a customer relations management application, enterprise resource planning applications, and a supply chain management application, the actionable items comprising at least one of identification of sales leads, identification of customer relations issues, or identification of dissatisfied customers;
wherein the social media content comprises messages from a messaging system that are distributed based upon identification of followers for the messages, the social media content originating from at least one of public social networks or private social media networks, the public social media networks including at least blog sites, forums, twitter messages, RSS data, and Facebook, and the private social networks including at least internal company social networking sites, emails, chats, transcribed phone conversations, and transcribed videos;
wherein the social profile data comprises at least psychographic information about an authors income, age, profession, geographic location, concerns, affinities, or other areas of interest, and wherein the social profile data is pre-analyzed to establish analysis data pertaining to the author prior to creation of the social media content; and
wherein the geographic location is inferred from author location data or social profile data.

8. A non-transitory computer readable medium having stored thereon a sequence of instructions which, when executed by a processor causes the processor to execute a method for analyzing social media data correlating disparate social media data and identifying a context for correlated media data, the method comprising:
analyzing social media messages using an analysis unit, the analysis unit being communicatively coupled to receive inputs from one or more online social data sources and to provide analysis outputs to a workflow engine, the analysis unit correlating the social media messages to identify a context based at least upon analysis of message contents, metadata, and social profile data, the analysis of the social media messages performed by a process comprising:
receiving social media content from the one or more online social data sources transmitted over one or more electronic communications links, the social media content comprising at least message contents, metadata, and social profile data,
determining a geographic location of the message contents,
removing the message contents that are beyond a geographical distance from the geographic location of at least one of the message contents,
performing latent semantic analysis on remaining message contents using the metadata and the social profile data to determine semantic significance of the remaining message contents,
clustering the messages into one or more clusters by classifying the messages based on at least the results of performing latent semantic analysis, and
correlating the at least one of the one or more clusters to identify a context for the remaining message contents using at least the metadata and the remaining message contents to generate correlation results,
processing the correlation results using the workflow engine, the workflow engine processing the correlation results using a set of rules provided in a rulebase, the set of rules identifying how actionable items should be handled or directed within an organization, the correlation results processed by:
receiving the correlation results from the analysis unit transmitted over one or more electronic communications links,
identifying one or more actionable items based at least in part on the received correlation results,
automatically processing at least some of the one or more actionable items using the workflow engine and the set of rules.

9. The computer readable medium of claim 8, wherein the social profile data comprises demographic or psychographic information about an author of the social media content.

10. The computer readable medium of claim 8, wherein the social profile data is pre-analyzed to establish analysis data pertaining to an author prior to creation of the social media content.

11. The computer readable medium of claim 8, wherein correlating comprises using at least one of location data, time data, volume data, and subject matter data.

12. The computer readable medium of claim 8 in which semantic filtering is performed to reduce occurrence of false positives, false negatives or inappropriate responses.

13. The computer readable medium of claim 8, wherein the analysis results are obtained that create actionable items for an enterprise software system and the enterprise software system comprises at least one of a customer relations management application, an enterprise resource planning applications, and a supply chain management application.

14. The computer readable medium of claim 8, the method further comprising
filtering to reduce occurrences of false positives, false negatives or inappropriate responses, the filtering comprising at least semantic filtering;
storing the correlation results in an electronic database on one or more persistent computer readable storage devices;
wherein correlating comprises using at least one of location data, time data, volume data, and subject matter data;
wherein the workflow engine is part of an enterprise software system comprising at least one of a customer relations management application, enterprise resource planning applications, and a supply chain management application, the actionable items comprising at least one of identification of sales leads, identification of customer relations issues, or identification of dissatisfied customers;
wherein the social media content comprises messages from a messaging system that are distributed based upon identification of followers for the messages, the social media content originating from at least one of public social networks or private social media networks, the public social media networks including at least blog sites, forums, twitter messages, RSS data, and Facebook, and the private social networks including at least internal company social networking sites, emails, chats, transcribed phone conversations, and transcribed videos;
wherein the social profile data comprises at least psychographic information about an authors income, age, profession, geographic location, concerns, affinities, or other areas of interest, and wherein the social profile data is pre-analyzed to establish analysis data pertaining to the author prior to creation of the social media content; and
wherein the geographic location is inferred from author location data or social profile data.

15. A computer system for analyzing social media data, comprising:
- a computer processor to execute a set of program code instructions; and
- a memory to hold the program code instructions, in which the program code instructions comprises program code to perform acts comprising:
  - analyzing social media messages using an analysis unit, the analysis unit being communicatively coupled to receive inputs from one or more online social data sources and to provide analysis outputs to a workflow engine, the analysis unit correlating the social media messages to identify a context based at least upon analysis of message contents, metadata, and social profile data, the analysis of the social media messages performed by a process comprising:
    - receiving social media content from the one or more online social data sources transmitted over one or more electronic communications links, the social media content comprising at least message contents, metadata, and social profile data,
    - determining a geographic location of the message contents,
    - removing the message contents that are beyond a geographical distance from the geographic location of at least one of the message contents,
    - performing latent semantic analysis on remaining message contents using the metadata and the social profile data to determine semantic significance of the remaining message contents,
    - clustering the messages into one or more clusters by classifying the messages based on at least the results of performing latent semantic analysis, and
  - correlating the at least one of the one or more clusters to identify a context for the remaining message contents using at least the metadata and the remaining message contents to generate correlation results,
  - processing the correlation results using the workflow engine, the workflow engine processing the correlation results using a set of rules provided in a rulebase, the set of rules identifying how actionable items should be handled or directed within an organization, the correlation results processed by:
    - receiving the correlation results from the analysis unit transmitted over one or more electronic communications links,
    - identifying one or more actionable items based at least in part on the received correlation results,
    - automatically processing at least some of the one or more actionable items using the workflow engine and the set of rules.

16. The system of claim 15, wherein the social profile data is pre-analyzed to establish analysis data pertaining to an author prior to creation of the social media content.

17. The system of claim 15, wherein correlating comprises using at least one of location data, time data, volume data, and subject matter data.

18. The system of claim 15 in which semantic filtering is performed to reduce occurrence of false positives, false negatives or inappropriate responses.

19. The system of claim 15, wherein the analysis results are obtained that create actionable items for an enterprise software system and the enterprise software system comprises at least one of a customer relations management application, an enterprise resource planning applications, and a supply chain management application.

20. The system of claim 15, the actions further comprising
- filtering to reduce occurrences of false positives, false negatives or inappropriate responses, the filtering comprising at least semantic filtering;
- storing the correlation results in an electronic database on one or more persistent computer readable storage devices;
- wherein correlating comprises using at least one of location data, time data, volume data, and subject matter data;
- wherein the workflow engine is part of an enterprise software system comprising at least one of a customer relations management application, enterprise resource planning applications, and a supply chain management application, the actionable items comprising at least one of identification of sales leads, identification of customer relations issues, or identification of dissatisfied customers;
- wherein the social media content comprises messages from a messaging system that are distributed based upon identification of followers for the messages, the social media content originating from at least one of public social networks or private social media networks, the public social media networks including at least blog sites, forums, twitter messages, RSS data, and Facebook, and the private social networks including at least internal company social networking sites, emails, chats, transcribed phone conversations, and transcribed videos;
- wherein the social profile data comprises at least psychographic information about an authors income, age, profession, geographic location, concerns, affinities, or other areas of interest, and wherein the social profile data is pre-analyzed to establish analysis data pertaining to the author prior to creation of the social media content; and
- wherein the geographic location is inferred from author location data or social profile data.

* * * * *